US012216893B2

(12) United States Patent
Frumar et al.

(10) Patent No.: US 12,216,893 B2
(45) Date of Patent: *Feb. 4, 2025

(54) VIDEO PLAYER WITH ASSISTED SEEK

(71) Applicant: Google LLC, Mountain View, CA (US)

(72) Inventors: Julian Frumar, San Francisco, CA (US); Jasson Schrock, Mountain View, CA (US); Ryan Junee, San Francisco, CA (US); Simon Ratner, San Francisco, CA (US); Geoff Stearns, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/751,524

(22) Filed: May 23, 2022

(65) Prior Publication Data
US 2022/0357838 A1 Nov. 10, 2022

Related U.S. Application Data

(63) Continuation of application No. 16/773,973, filed on Jan. 27, 2020, now Pat. No. 11,340,771, which is a
(Continued)

(51) Int. Cl.
G06F 3/04847 (2022.01)
G06F 3/0482 (2013.01)
(Continued)

(52) U.S. Cl.
CPC ........ G06F 3/04847 (2013.01); G06F 3/0482 (2013.01); G06F 3/04845 (2013.01);
(Continued)

(58) Field of Classification Search
None
See application file for complete search history.

(56) References Cited

U.S. PATENT DOCUMENTS 7,603,682 B1 * 10/2009 Akiyama ............... H04H 60/33
725/139
8,849,101 B2 * 9/2014 Rosser ................. G11B 27/105
386/350
(Continued)

FOREIGN PATENT DOCUMENTS

CN 1321395 A 11/2001
CN 1461484 A 12/2003
(Continued)

OTHER PUBLICATIONS

Dave Z., "Mac Netflix Watch Instantly via Silverlight", YouTube, Video uploaded on Nov. 1, 2008, 2 pages, [online][retrieved on May 31, 2013] Video can be retrieved from the internet <URL:http://www.youtube.come/watch?v=a3smG36vblo>, 4 minutes and 35 seconds.

(Continued)

Primary Examiner — Tuyetlien T Tran
(74) Attorney, Agent, or Firm — Lowenstein Sandler LLP

(57) ABSTRACT

A method for presenting content comprises receiving a content item; receiving a plurality of thumbnails from the content item, each thumbnail associated with a point in the content item; playing the content item starting at a first point; receiving in a user interface a selection at a second point in the content item; presenting, in the user interface, first content of the content item at the second point; and presenting, in the user interface, a subset of the plurality of thumbnails, the subset arranged based on a predetermined order and including a thumbnail associated with the second point.

18 Claims, 11 Drawing Sheets

Related U.S. Application Data continuation of application No. 15/149,146, filed on May 8, 2016, now Pat. No. 10,545,652, which is a continuation of application No. 12/976,858, filed on Dec. 22, 2010, now Pat. No. 9,363,579.

(51) Int. Cl.

| | | |
|---|---|---|
| *G06F 3/04845* | (2022.01) | |
| *G06F 3/0485* | (2022.01) | |
| *G06F 3/04883* | (2022.01) | |
| *G11B 27/34* | (2006.01) | |
| *H04N 21/437* | (2011.01) | |
| *H04N 21/472* | (2011.01) | |
| *H04N 21/6587* | (2011.01) | |
| *H04N 21/81* | (2011.01) | |
| *H04N 21/8549* | (2011.01) | |
| *G06F 3/0481* | (2022.01) | |
| *G06F 3/0484* | (2022.01) | |
| *G06F 3/04842* | (2022.01) | |

(52) U.S. Cl.
CPC ........ *G06F 3/0485* (2013.01); *G06F 3/04883* (2013.01); *G11B 27/34* (2013.01); *H04N 21/437* (2013.01); *H04N 21/47217* (2013.01); *H04N 21/6587* (2013.01); *H04N 21/8153* (2013.01); *H04N 21/8549* (2013.01); *G06F 3/0481* (2013.01); *G06F 3/0484* (2013.01); *G06F 3/04842* (2013.01)

(56) References Cited

U.S. PATENT DOCUMENTS

| | | | |
|---|---|---|---|
| 2002/0075572 A1* | 6/2002 | Boreczky | H04N 21/8455 359/722 |
| 2002/0186234 A1* | 12/2002 | Van De Streek | G06F 16/745 |
| 2003/0184598 A1* | 10/2003 | Graham | G06F 16/30 707/E17.058 |
| 2006/0080716 A1* | 4/2006 | Nishikawa | H04N 21/472 386/E5.052 |
| 2007/0088844 A1* | 4/2007 | Seims | H04L 65/762 709/231 |
| 2007/0168413 A1* | 7/2007 | Barletta | G06F 16/9577 707/E17.121 |
| 2007/0198111 A1* | 8/2007 | Oetzel | G11B 27/105 |
| 2007/0204238 A1* | 8/2007 | Hua | G06F 16/745 715/838 |
| 2008/0007570 A1* | 1/2008 | Wessel | G11B 19/025 345/661 |
| 2008/0055272 A1 | 3/2008 | Anzures et al. | |
| 2008/0086688 A1* | 4/2008 | Chandratillake | G06F 16/738 707/E17.028 |
| 2008/0263448 A1* | 10/2008 | Oppenheimer | H04N 21/234327 715/838 |
| 2008/0276269 A1* | 11/2008 | Miller | H04N 21/23424 725/34 |
| 2008/0320391 A1 | 12/2008 | Lemay et al. | |
| 2009/0024923 A1* | 1/2009 | Hartwig | G06F 16/70 715/716 |
| 2009/0058822 A1 | 3/2009 | Chaudhri | |
| 2009/0063981 A1* | 3/2009 | Kikuchi | G11B 27/105 715/723 |
| 2009/0064048 A1 | 3/2009 | Bhattacharya | |
| 2009/0064222 A1* | 3/2009 | Dawson | H04N 21/4316 725/38 |
| 2009/0153288 A1 | 6/2009 | Hope et al. | |
| 2009/0172543 A1* | 7/2009 | Cronin | G06F 3/0485 715/721 |
| 2009/0174677 A1 | 7/2009 | Gehani et al. | |
| 2009/0297123 A1* | 12/2009 | Virdi | H04N 21/2358 386/240 |
| 2010/0082585 A1* | 4/2010 | Barsook | G06F 16/9535 707/706 |
| 2010/0156833 A1* | 6/2010 | Kim | G04G 21/08 345/173 |
| 2010/0162313 A1* | 6/2010 | Ruiz-Velasco | H04N 21/23418 725/44 |
| 2010/0214237 A1* | 8/2010 | Echeverri | G06F 3/04883 345/173 |
| 2010/0231534 A1* | 9/2010 | Chaudhri | G06F 3/04855 345/173 |
| 2010/0241962 A1* | 9/2010 | Peterson | G11B 27/34 715/720 |
| 2010/0303440 A1* | 12/2010 | Lin | H04N 21/4828 725/118 |
| 2010/0306801 A1* | 12/2010 | Filippov | H04N 21/47 725/44 |
| 2011/0149138 A1* | 6/2011 | Watkins | G11B 27/005 345/173 |
| 2011/0298830 A1* | 12/2011 | Lam | G06F 3/04883 345/173 |
| 2012/0042246 A1* | 2/2012 | Schwesinger | H04N 21/4223 715/800 |
| 2012/0079421 A1* | 3/2012 | Arriola | G06F 3/04812 715/784 |

FOREIGN PATENT DOCUMENTS

| | | |
|---|---|---|
| CN | 101529367 A | 9/2009 |
| CN | 101620738 A | 1/2010 |

OTHER PUBLICATIONS

Synergist, "Scrubbing with Thumbnails with the SMF Player," MSDN Blogs, Microsoft, Jan. 22, 2010, 4 Pages [online]retrieved on May 31, 2013] Retrieved from the internet <URL:http://blogs.msdn.com/b/synergist/archive/2010/01/22/scrubbing-with-thumbnails-with-the-smf-player.aspx>.

PCT International Search Report and Written Opinion, PCT Application No. PCT/US2011/061800, May 24, 2012, 9 pages.

Netherlands Search Report and Written Opinion, Netherlands Application No. 2007912, Jun. 27, 2012, 12 pages.

Chinese First Office Action, Chinese Patent Office Application No. 201180062252.1 with translation, Oct. 27, 2015, 9 pages.

Office Action for Chinese Patent Application No. CN 201180062252.1, Aug. 1, 2016, 8 pages.

Specification of U.S. Appl. No. 61/404,273, filed Sep. 29, 2010, 99 pages, [online][retrieved on May 5, 2015] Retrieved from the internet.

* cited by examiner

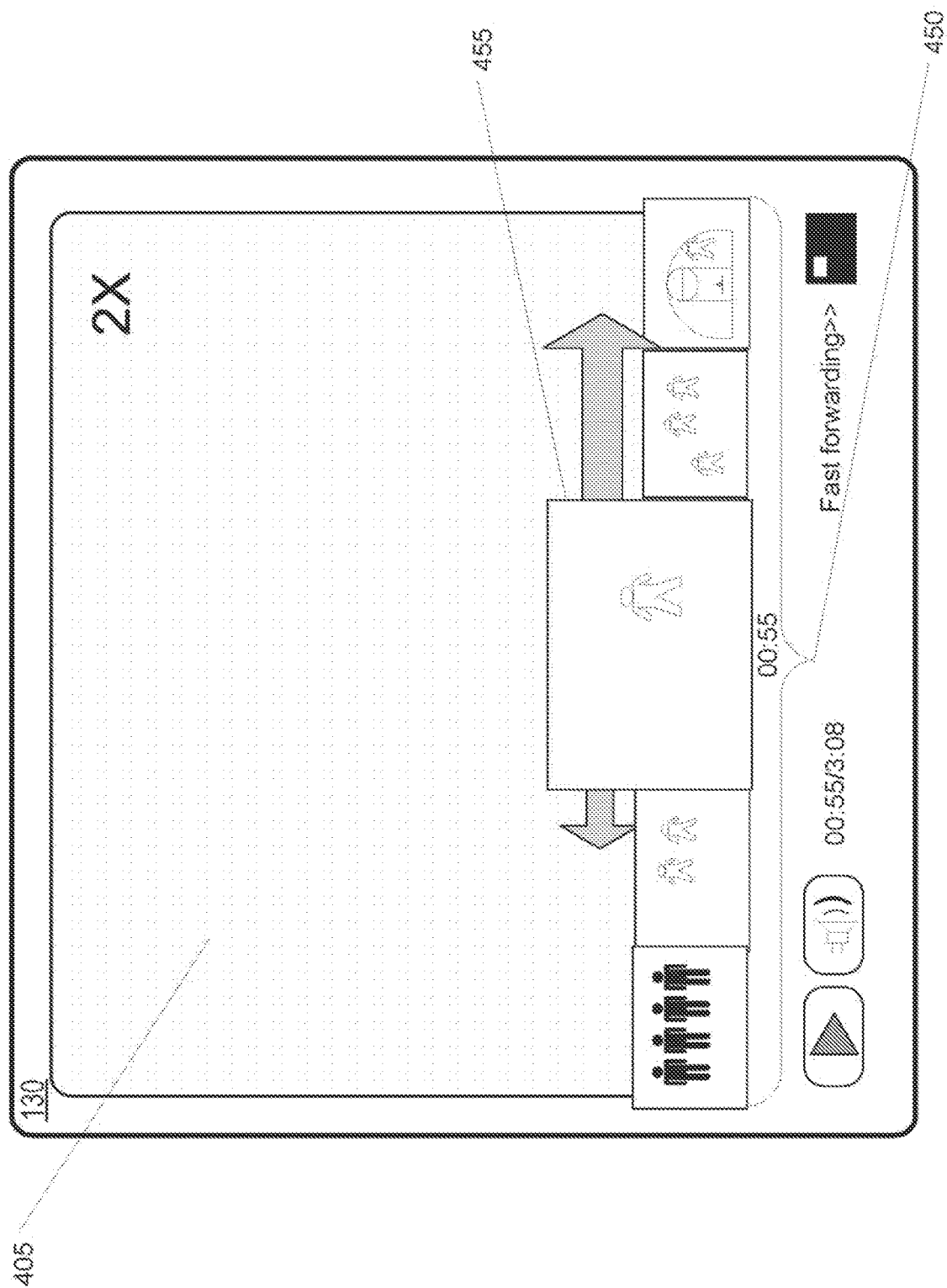

VIDEO PLAYER WITH ASSISTED SEEK

CROSS REFERENCE TO RELATED APPLICATIONS

This application is a continuation application of U.S. application Ser. No. 16/773,973, filed Jan. 27, 2020, which is a continuation application of U.S. application Ser. No. 15/149,146, filed May 8, 2016, now U.S. Pat. No. 10,545,652, which is a continuation of U.S. application Ser. No. 12/976,858, filed Dec. 22, 2010, now U.S. Pat. No. 9,363,579, each of which is incorporated herein by reference

BACKGROUND

Field of the Invention

The present invention relates generally to web-based video display and specifically to an improved method for navigation within video content.

Description of the Related Art

Various web sites exist that provide hosted video content to viewers. One such site is the YOUTUBE™ site, provided by Google Inc. of Mountain View, California. Typically, videos are supplied to the video hosting website by content providers, and are then made available for viewing by the public at large.

Conventionally, when a video is provided for online viewing, instead of requiring the client device to obtain the entire video before beginning to play the video, the video starts to play after a pre-determined amount of the video has been received by the client device. As the video plays, additional content is provided and buffered locally. Consequently, if a user chooses to fast forward through a portion of the video, images are only available for the portion of the video that is buffered locally at the client device. Beyond that point, the users are fast forwarding blindly, not knowing where they are in the video unless they happen to know the precise time stamp of where they want to go. Some users fast forward to get past a portion that is not of interest, although the users do not know how long that portion will last.

Additionally, navigating forward or backward through a video often requires clicking on a relatively small icon in the user interface. A small icon can be difficult to click on accurately and as video resolution improves, icons can be made even smaller and thus even more difficult to click on. More televisions are internet enabled and thus users will be farther away from the display device on which they are viewing video content and this adds to the difficulty of accurately clicking on a small icon.

SUMMARY

Embodiments of the present invention provide methods for navigation through video content. A video is played to a user with a set of thumbnails associated with time points before and after the time point in the video currently being displayed. The thumbnails update as the video plays. To move fast forward or rewind through the video, the user interacts with the user interface by making a gesture. The magnitude and direction of the gesture correspond to the speed and direction, respectively, of the desired video playback. Even if a user fast-forwards past the portion of the video file buffered locally, the thumbnails are available and provide guideposts to the user as the user navigates through the content.

BRIEF DESCRIPTION OF THE DRAWINGS

FIGS. 5A-5B are mock-ups of screenshots of a graphical user interface as a user navigates through video content in a second example.

DETAILED DESCRIPTION

Introduction

A user requests a webpage with an embedded multimedia file using a browser and the browser receives a container file as part of the webpage. The container file is internally linked to the multimedia server and causes the browser to download the multimedia file to the browser. The multimedia content being downloaded is displayed on the multimedia player within the webpage as the content becomes available. The user navigates through the video, moving backwards or forwards at a plurality of speeds with the assistance of thumbnails that act as guideposts to the video.

Architecture

Figure 1:
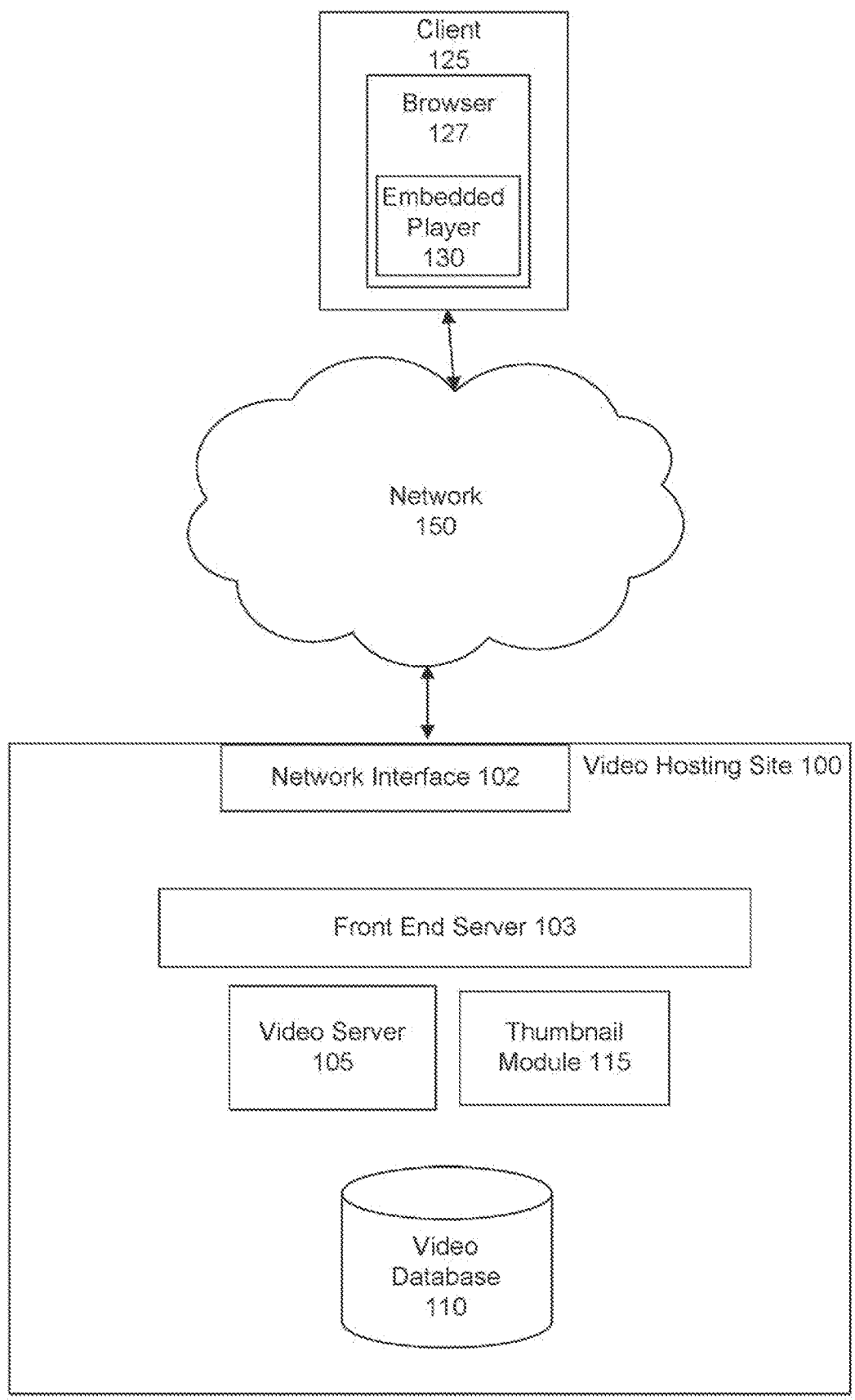
FIG. 1 is a block diagram of the overall architecture according to one embodiment.

FIG. 1 is a block diagram of the overall architecture of one embodiment. The video hosting site 100 communicates, usually via the network interface 102, with a client 125 via the network 150. The network 150 is typically the Internet, but may also be any network, including but not limited to a LAN, a MAN, a WAN, a mobile, wired or wireless network, a private network, or a virtual private network, or any combination thereof. For simplicity only one client 125 is shown. In practice a very large numbers (e.g., millions) of clients 125, or as many as can be supported by the hardware and software implementation, can be in communication with the video hosting site 100 at any time. Other conventional features, such as firewalls, load balancers, authentication servers, application servers, failover servers, site management tools, and so forth are not shown so as to more clearly illustrate the features of the video hosting site 100. An example of a suitable video hosting site 100 is the YOUTUBE™ website, found at www.youtube.com. Other video hosting sites are known as well, and can be adapted to operate according to the teachings disclosed herein. The illustrated components of the video hosting site 100 can be implemented as single pieces of software or hardware or as multiple pieces of software or hardware. In general, functions described in one embodiment as being performed by one component, can also be performed by other components in other embodiments, or by a combination of components. Furthermore, functions described in one embodiment as being performed by components of the video hosting site 100 can also be performed by one or more clients 125 in other embodiments if appropriate.

In addition to the network interface 102, the video hosting site 100 comprises a front end server 103, video server 105, video database 110 and thumbnail module 115. The front end server 103 receives the users' requests for a video file and forwards the request for the video file to the video server 105. The front end server 103 may be, for example, a web server providing web content including a user interface to client 125.

The video server 105 retrieves the video file and associated thumbnails from the video database 110 and transmits the data to the client 125. The video server 105 also receives uploaded videos from content providers. Content may be uploaded to video server 105 via the Internet from a personal computer, through a cellular network from a telephone or PDA, or by other means for transferring data over network 150 known to those of ordinary skill in the art. Content may be transmitted or downloaded from video server 105 in a similar manner. In one embodiment a video is transmitted as a file download to a client 125, and in an alternative embodiment, the video is streamed to client 125. The means by which the video is received by video server 105 need not match the means by which it is delivered to client 125. For example, a content provider may upload a video file via a browser on a personal computer, whereas client 125 may receive that content as a data stream.

The video database 110 is used to store uploaded videos. Video database 110 stores video content and associated metadata provided by source of the video content, by the operator of video hosting site 100, or by third parties. The videos have metadata associated with each file to describe characteristics of the video file or its content. For example, metadata stored may include a video ID, an ID of the user who provided the video, artist, video title, label, genre, time length, and geo-restrictions that can be used for data collection or content blocking on a geographic basis. Additionally, thumbnails generated by the thumbnail module 115 from a video are stored in the video database 110.

The thumbnail module 115 creates thumbnails for videos in the video database 110. In one embodiment thumbnails are still images of the video at predetermined time points. For example, a thumbnail is created at every one second mark in the video, every half second mark, or every two second mark. More frequent or less frequent thumbnails are possible as well. In one embodiment, thumbnails are created whenever there is a scene change in the video. Such points in the video can be determined manually or by a scene-detection algorithm. In an alternate embodiment, a thumbnail is a slice of video content of predetermined length. The thumbnail module 115 takes slices of video content at predetermined intervals or at scene changes. In yet another embodiment, thumbnails can include both still images and video content. For example, scene changes could have video content as the thumbnail while other thumbnails for the video are still images.

Each of the various servers described in FIG. 1 is implemented as a server program executing on server-class computer comprising a CPU, memory, network interface, peripheral interfaces, and other well-known components. The computers themselves in various embodiments run an operating system such as LINUX, Microsoft Windows, or Apple OS X, have generally high performance CPUs, 1 GB or more of memory, and 100 GB or more of disk storage. Of course, other types of computers can be used, and as more powerful computers are developed in the future, they can be configured in accordance with the teachings here. The functionality implemented by any of the elements can be provided from computer program products that are stored in tangible computer accessible storage mediums (e.g., RAM, hard disk, or optical/magnetic media) and accessed by the computer(s). Generally, functions described in one embodiment as being performed on the server side can also be performed on the client side in other embodiments if appropriate. Additionally, the functionality attributed to a particular component can be performed by different or multiple components operating together.

The client 125 is any device capable of accessing the network. Examples include, but are not limited to, general purpose computers, handheld mobile devices, gaming consoles, internet-enabled televisions and cable or satellite set top boxes. The client 125 includes a browser 127 with an embedded player 130. The client 125 views videos from video hosting site 100 using software suited for that purpose. Typically that software is the browser 127 such as Microsoft Internet Explorer, Mozilla Firefox, Apple Safari, etc. Alternatively, client-specific or site-specific software may be used. The embedded player 130 may be a video player (e.g., Flash™ from Adobe Systems, Inc.), or any other player adapted for the video file formats used in the video hosting site 100. The embedded player 130 may be supplied by the video hosting site's 100 website or by a third-party web site. The client 125 further includes a means for accepting input from a user. That means includes, but is not limited to, a pointing device such as a mouse, a keyboard or a touch-screen. In some embodiments, the browser 127 is displayed to the user on the touch-screen. In another embodiment, the input from the user is input to a remote control which relays the input to the client 125.

A user can access a set of videos directly from the video hosting site 100 by visiting the video hosting site 100 and browsing a catalog of videos, conducting searches on keywords, reviewing play lists from other users or the system administrator (e.g., collections of videos forming channels), viewing videos associated with particular user group (e.g., communities), or by directly accessing the video resource, e.g., via a URL.

Figure 2:
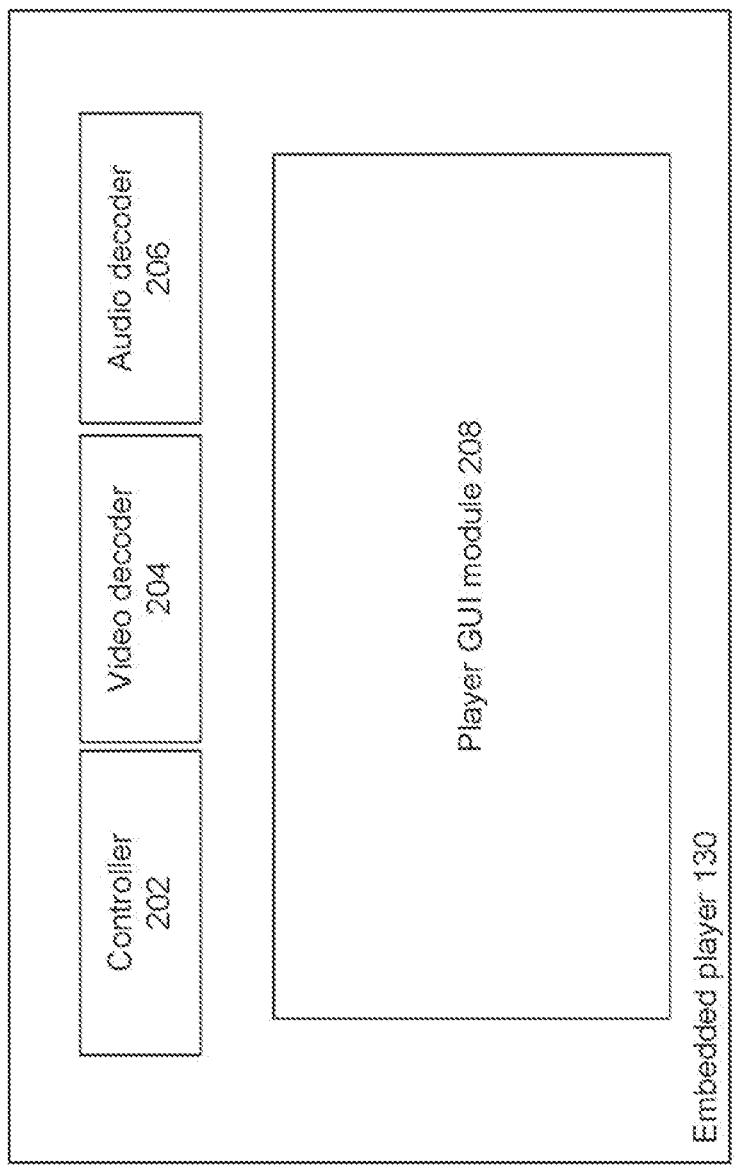
FIG. 2 illustrates an embedded player capable of communicating with a content hosting server and displaying the requested content and corresponding graphical user interface according to one embodiment of the invention.

FIG. 2 illustrates an embedded player 130 capable of communicating with a content hosting server and displaying the requested content and corresponding graphical user interface according to one embodiment of the invention. The embedded player 130 comprises a controller 202, video decoder 204, audio decoder 206, and player graphic user interface (GUI) module 208.

The controller 202 implements the state machine of embedded player 130 and directs the video decoder 204, audio decoder 206 and player GUI module 208 to execute their respective tasks at appropriate times. The controller 202 also communicates with the video hosting site 100 to request and receive videos to be displayed on the embedded player 130.

The video decoder 204 decodes encoded video files received from the video hosting site 100. The video decoder 204 can support a variety of video compression standards like MPEG 1, MPEG 2, MPEG 4, etc. The video decoder 204 also provides thumbnails for display at the direction of the controller 202.

The audio decoder 206 decodes encoded audio files received from the video hosting site 100. The audio decoder 206 can support a variety of audio compression standards like GSM-AMR, AC3, MPEG-1, MPEG-2, MPEG-3, etc.

The player GUI module 208 determines and displays the graphical user interface for the embedded player 130. Additionally, the player GUI module 208 receives gestures and conveys the user selections to appropriate modules. For example, when a user wants to pause, skip ahead or move backwards in a video file being played, the player GUI module 208 relays the user's selection to appropriate modules like video decoder 204 and audio decoder 206.

Figure 3:
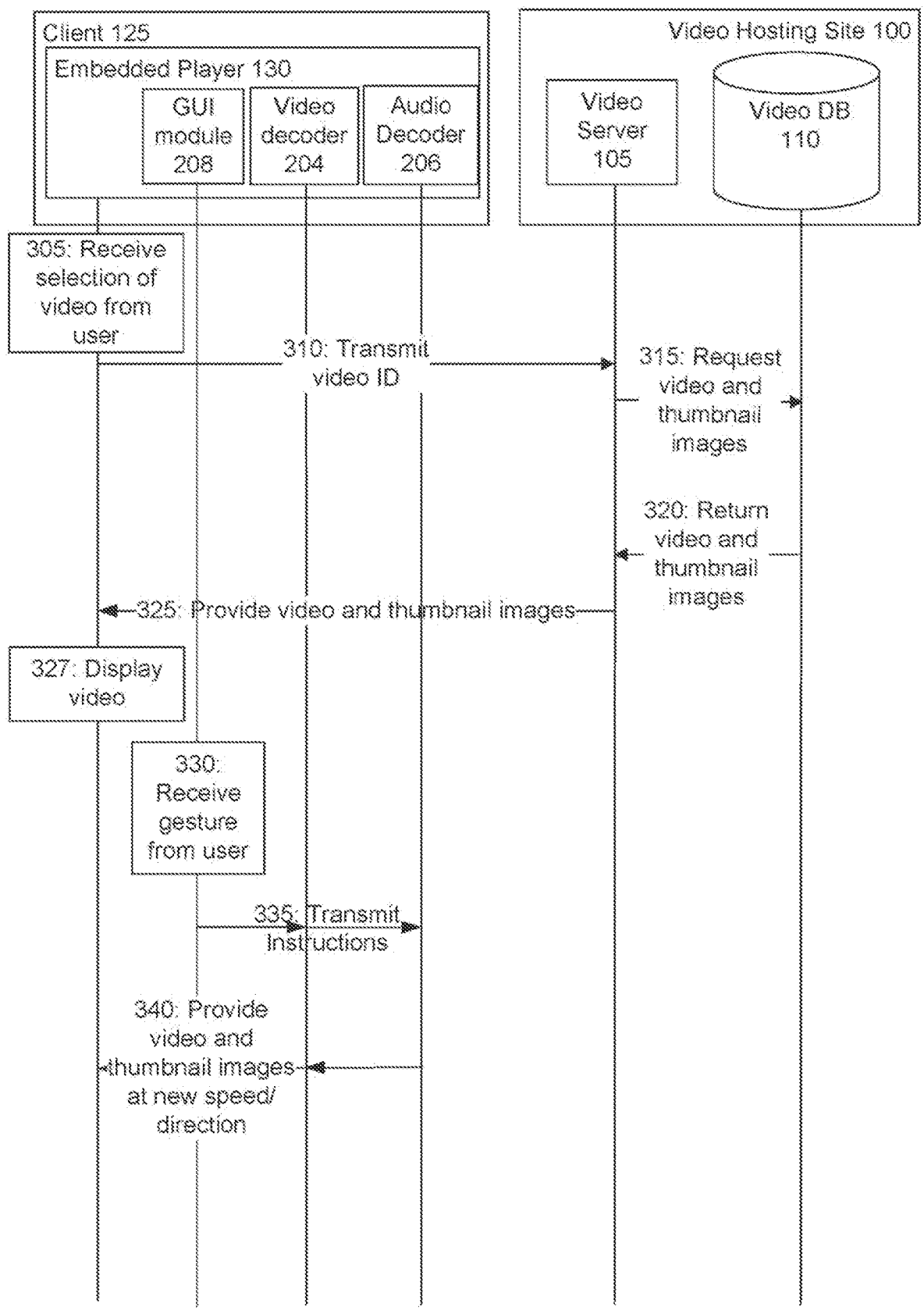
FIG. 3 is a data flow chart illustrating a method for updating a display of video content according to one embodiment.
Figure 4A:
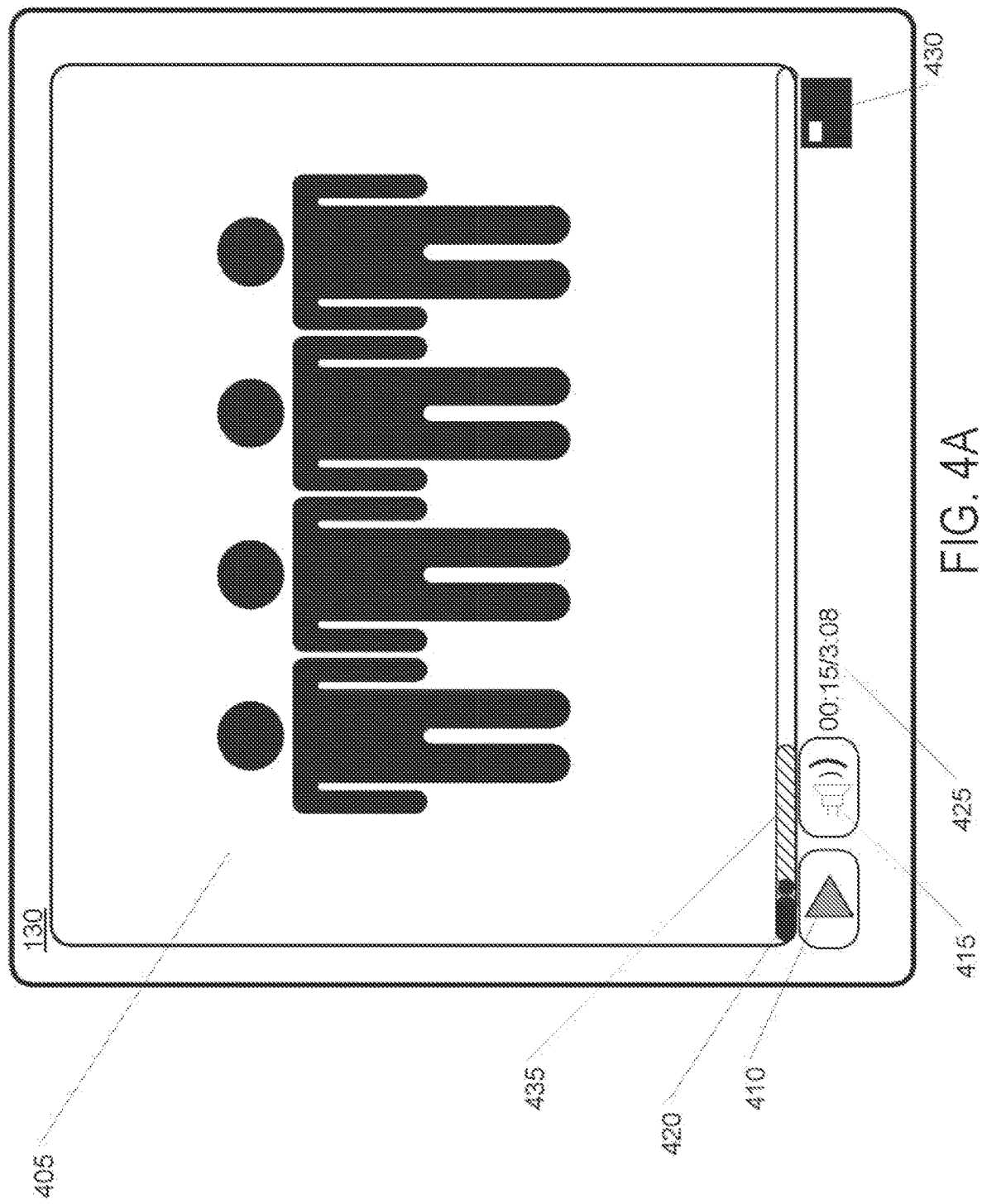
FIGS. 4A-4F are mock-ups of screenshots of a graphical user interface as a user navigates through video content in a first example.
Figure 4B:
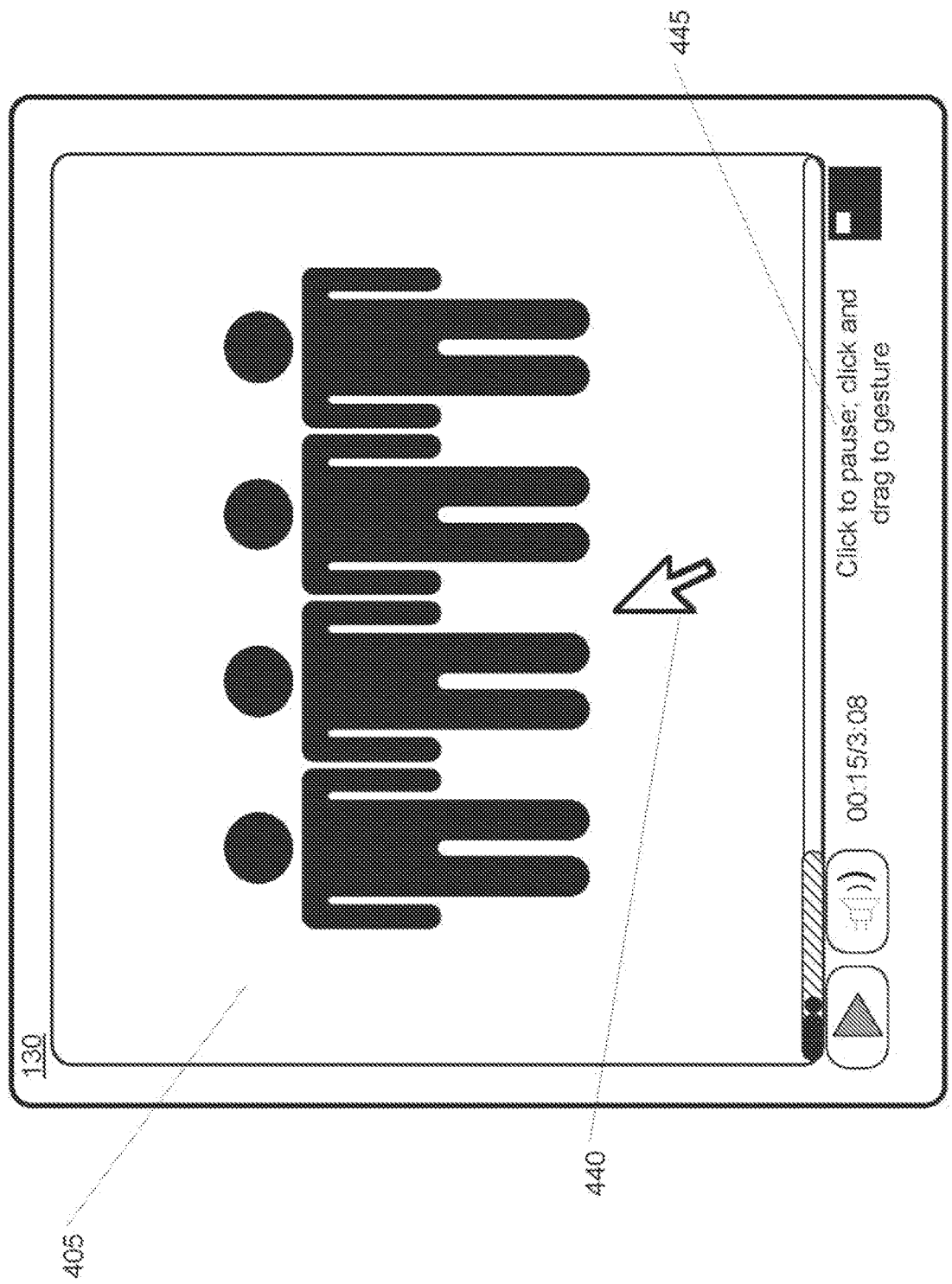
Figure 4C:
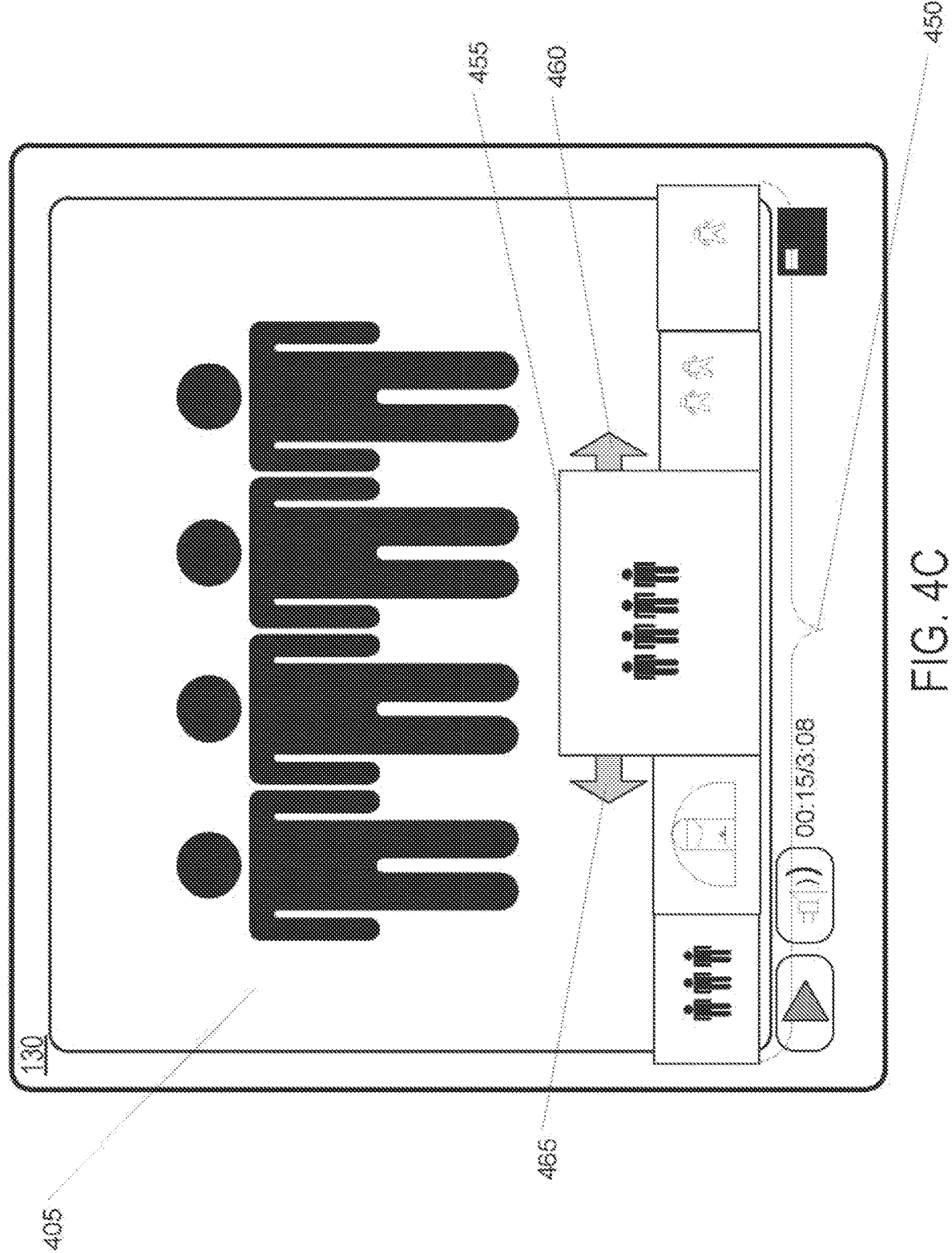
Figure 4D:
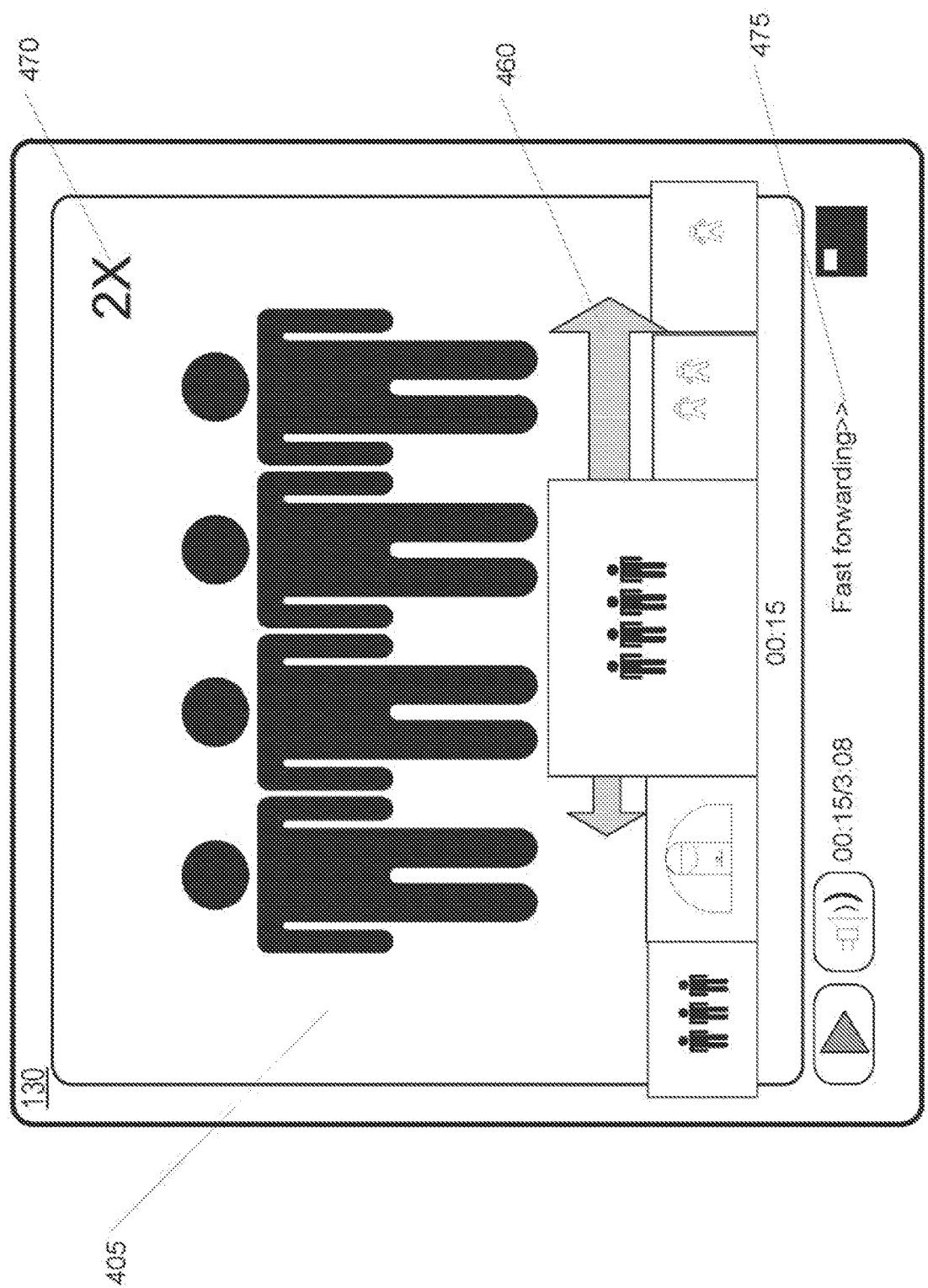
Figure 4E:
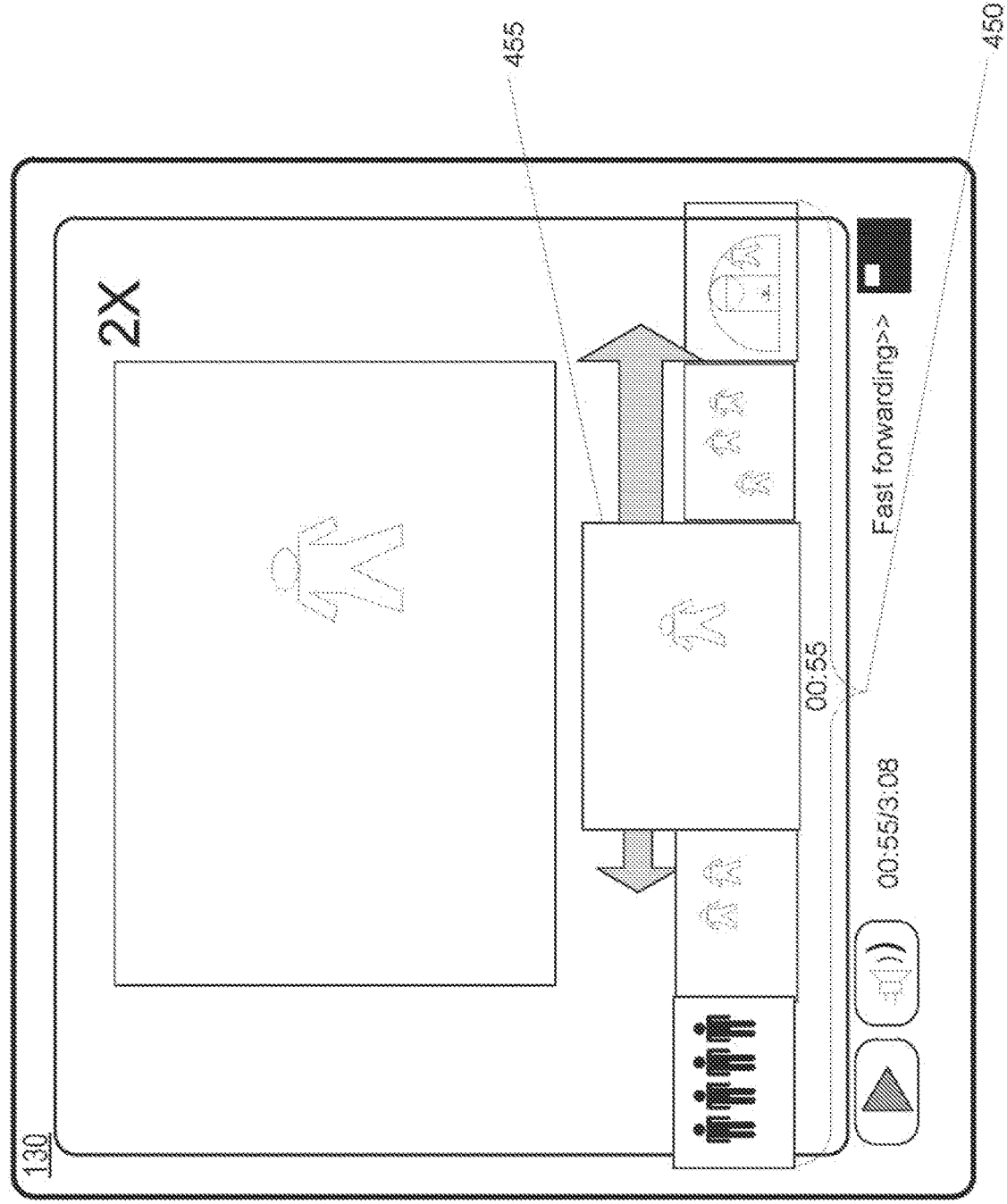
Figure 4F:
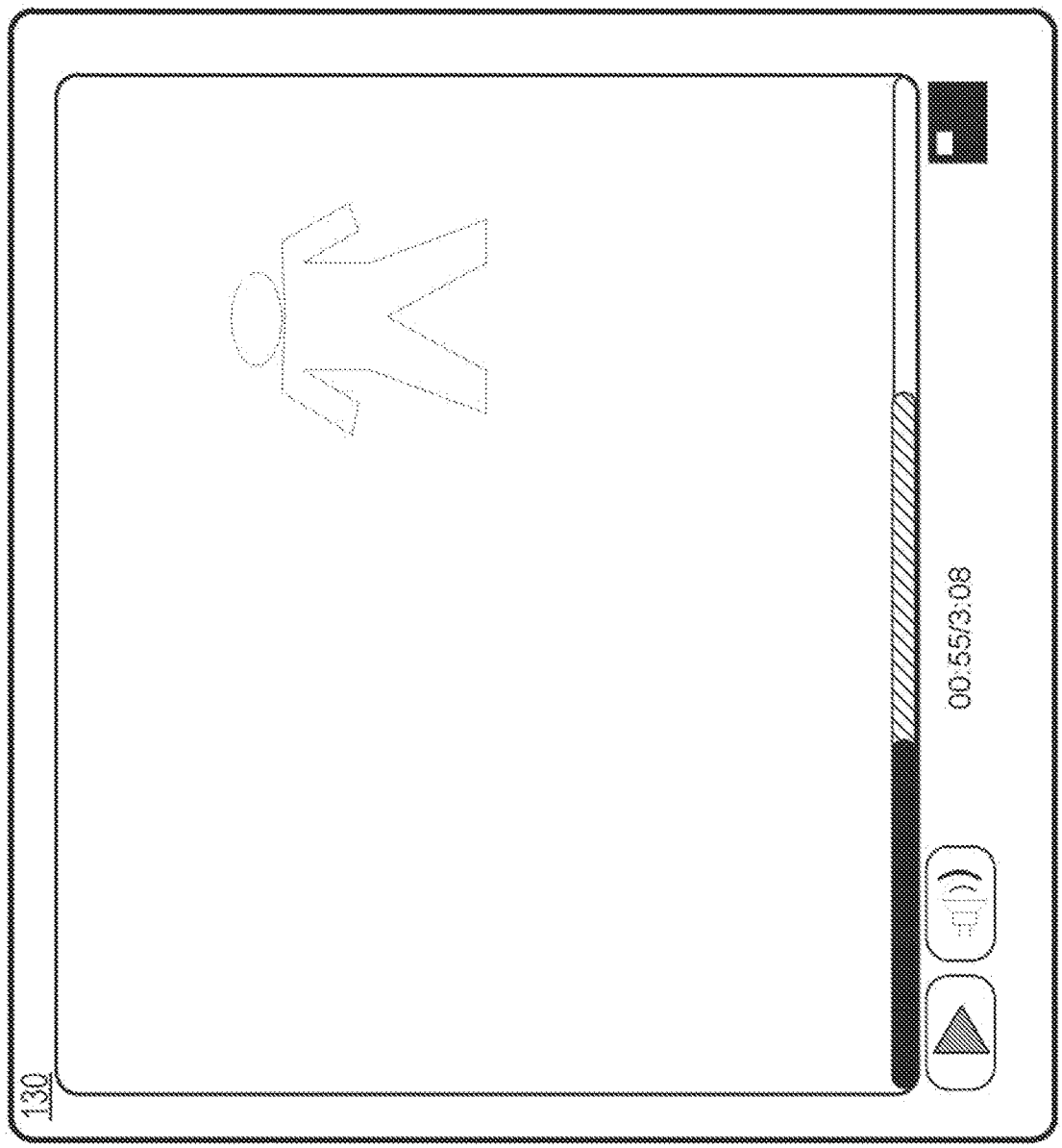
Figure 5B:
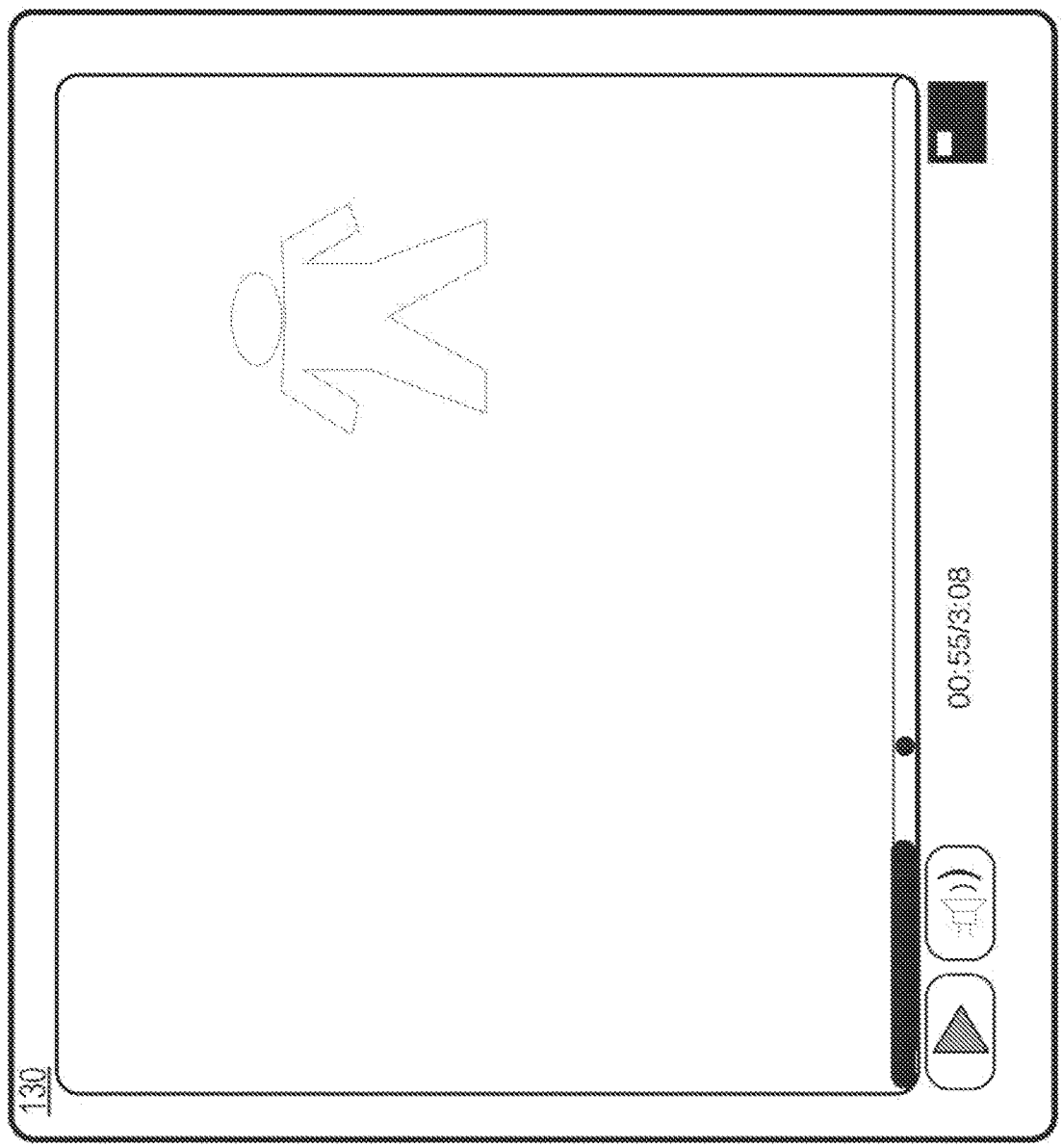

FIGS. 3, 4 and 5 illustrate how a user requests a video and navigates through the video, moving backwards or forwards at a plurality of speeds with the assistance of thumbnails that act as guideposts to the video. The system updates the display of the video in response to the user's input as to the direction and speed desired for the playback. FIG. 3 is a data flow chart and FIGS. 4A-4G and 5A-5B are illustrations of the user interface as displayed to the user.

A user at a client 125 selects a video to watch and that request is received 305 by the embedded player 130. An identifier ("ID") identifying the requested video is transmitted 310 to the video server 105 at the video hosting site 100. The video server 105 requests 315 the video and associated thumbnails from the video database 110 which returns 320 the video and associated thumbnails. The video server 105 in turn provides 325 the video and associated thumbnails to the embedded player 130 at the client 125. In one embodiment, the video server 105 provides the entire video file to the embedded player 130. Alternatively, the video file is streamed to the embedded player 130. In an embodiment where the video file is streamed to the embedded player 130, an initial portion of the video file is provided to the embedded player 130 to be loaded into the buffer to start playing. As the video starts to play, additional portions of the video file are provided to the buffer. In a preferred embodiment, the video file is streamed to the embedded player 130 and substantially all of the associated thumbnails are provided to the embedded player 130 when the video stream is started.

The video is displayed 327 at the client 125 in the embedded player 130. Referring to FIG. 4a, the embedded player 130 comprises a viewing window 405 and various controls. Example controls include a play/pause button 410, a volume control button 415, a viewing progress bar 420, a time indicator 425 and a go-to-full-screen button 430. Such controls are known in the art of embedded players and any known control buttons may be used with the embedded player 130. A user interacts with the controls using means for accepting input at the client 125. In one embodiment the user uses a mouse or keyboard to interact with the controls. Alternatively, the user's input is received via a remote control. In another embodiment, the embedded player 130 is displayed to the user on a touch screen and the user interacts with the controls by touching them directly on the touch screen.

The play/pause button 410 toggles between a play mode and pause mode of the video in the viewing window 405. The volume control button 415 allows the user to control the audio volume of the video. In one embodiment, selecting the volume control button 415 causes a slider control to appear with which the user can increase or decrease the volume. Additionally, such a slider control may also include a button which mutes the audio for the video.

When selected, the go-to-full-screen button 430 causes the size of the viewing window to increase. In one embodiment, the viewing window becomes the size of the display at the client 125.

The viewing progress bar 420 indicates how far along in the playback of the video the video is. That information is also presented digitally in the form of elapsed time in the time indicator 425 which shows where in time the video is in playback and the total time of the video. The viewing progress bar 420 further comprises a download progress bar 435 indicating the portion of the video that has been downloaded and is therefore available locally at the client.

Referring to FIG. 4B, upon a user mousing over the viewing window 405 as indicated by a pointer icon 440, instructions 445 for how to navigate the video are displayed to the user. A single click in the viewing window 405 toggles the video between playing and pausing. If the user clicks and holds in the viewing window 445, the user can navigate through the video by dragging to the left or the right to "fast forward" or "rewind" the video. In an alternative embodiment, instructions 445 are not displayed, or are controlled by a switch or other preference setting. For example, as users become more familiar with the navigation feature, instructions become less useful.

Referring to FIG. 4C, upon clicking and holding the mouse, a plurality of frames 450 displaying the thumbnails associated with the video are displayed to user. Additionally, playback of the video is paused by the controller 202 in the embedded player 130. The images are arranged in chronological order with those images associated with places in the video prior to the current place in playback to the left of the plurality of frames 450. Those images associated with places in the video coming after the current place in playback are to the right side of the plurality of frames 450. The larger frame 455 is the image closest in time to the current spot in time of the video's playback. Alternatively, the larger frame 455 displays the image currently being displayed to the user in the viewing window 405. Additionally, there are arrows 460 and 465 indicating that the video can be fast forwarded or rewound. Arrow 460 points to the right and towards the thumbnails that are the bookmarks for the video after the current place in playback. Arrow 465 points to the left and towards the thumbnails that are the bookmarks for the video prior to the current place in the playback.

Referring to FIG. 4D, when the user drags the clicked mouse to the left or the right, the corresponding arrow extends indicating that the video's playback is being accelerated in that direction. The extension of arrow 460 is the visual representation in the user interface of the embedded player of the clicking and dragging of the mouse by the user. The action of clicking and dragging is a gesture that is received 330 by the player GUI module 208. The gesture comprises not only a direction but also a magnitude. The direction indicates whether the user wishes to rewind for fast forward the video's playback. The magnitude of the gesture is how far to the left or to the right the user has dragged the mouse from the center of viewing window 405. The magnitude is represented visually by how far the arrow 460 is extended. The magnitude and direction of gesture are received 330 at the player GUI module 208. Using the magnitude and direction of the gesture, the player GUI module 208 transmits 335 instructions implementing the gesture to the video decoder 204 and audio decoder 206. In turn, the video decoder 204 and audio decoder 206 provide 340 the video and associated thumbnails at the speed and direction as requested by the magnitude and direction of the received gesture. The larger the magnitude of the gesture, the more quickly the video's playback moves ahead. In the case of rewinding, the magnitude of arrow 465 is the visual representation of how quickly the video is being requested to rewind by the user. The speed at which the video is being provided to the user is indicated by the display 470. In the example embodiment, the speed is two times normal playback speed in this case. In one embodiment, if the video is being rewound by the user, the speed is identified as negative. In another embodiment, the reverse direction is identified in an alternative manner such as for example red numbers. A text display 475 indicates to the viewer that the video is fast forwarding.

In another embodiment, instead of clicking and dragging in the viewing window 405, there is a control, such as for example, a jog stick that the user uses to fast forward or rewind the video. In yet another alternative, the user clicks and drags the viewing progress bar 420.

In addition to the playback of the video being altered, the subset of thumbnails displayed to the user also updates. The display of the thumbnails in the plurality of frames 450 is a visual table of contents that scrolls along the bottom of the viewing window 405. As illustrated in FIG. 4E, the video fast forwards or rewinds, the thumbnails fast forward and rewind as well with the thumbnail closest in time to the current time point in the video being displayed in the larger frame 455. The more quickly the video is being fast forwarded or rewound, the more quickly the thumbnails scroll by.

In an alternative embodiment, rather than playing the video at a higher rate of speed, the viewing window 405 displays the thumbnail currently displayed in the larger frame 455. As the user navigates, the thumbnails in the plurality of frames 450 update and each time the thumbnail in the larger frame 455 updates, the same thumbnail is displayed in the viewing window 405. If the video is being fast-forwarded or rewound at a high rate of speed, displaying the thumbnails in the viewing window 405 is more efficient.

Referring to FIG. 4F, when the user reaches the desired time point in the video, the user releases the click and drag, the video resumes playing at the normal speed.

In one embodiment, thumbnails for a chosen video are provided to the client 125 by the video hosting site 100. If however, not all of the video is provided to the client 125 and is instead streamed to the client 125, it is possible that when fast forwarding, the user will move through the portion of the video stored in the buffer and be attempting to fast forward through portions of the video not yet streamed to the client 125. In such an example, because all of the images were provided, the user is still able to navigate through the video. Referring to FIG. 5A, upon moving past the portion of video stored locally, the viewing window 405 no longer displays the video. The plurality of frames 450 continue to display and update thumbnails for the video as the user fast forwards through the video. In another embodiment, the viewing window 405 displays the thumbnail currently displayed in the larger frame 455.

Referring to FIG. 5B, after fast forwarding past the portion of the video file stored in the buffer, when the user releases the click and drag, the client 125 requests the video content from the video hosting site 100. The video hosting site 100 provides the content starting at the requested point and the viewing of the video continues as before, with the video hosting site 100 streaming the content to the client 125 and the client 125 storing some amount of content ahead of where the user is watching in a local buffer. Should the user then move backwards through the video to watch content that was previously skipped over, the client 125 requests that content from the video hosting site 100 if that content was not previously stored in the buffer.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of the player GUI module 208 may be provided in many modules or one module.

Unless specifically stated otherwise as apparent from the present discussion, it is appreciated that throughout the description, discussions utilizing terms such as "processing" or "computing" or "determining" or "displaying" or the like, refer to the action and processes of a computer system, or similar electronic computing device, that manipulates and transforms data represented as physical (electronic) quantities within the computer system memories or registers or other such information storage, transmission or display devices.

It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

What is claimed is:

1. A method comprising:
   requesting a video content item for viewing, the video content item associated with a plurality of thumbnails, each thumbnail corresponding to a point in the video content item;
   playing, in a user interface on a user device, the video content item starting at a current point;
   receiving, at a viewing progress bar in the user interface, a first drag gesture to a future point in the video content item, the future point corresponding to subsequent video content of the video content item, the first drag gesture having a first magnitude and a first direction to fast forward playback of the video content item;
   responsive to the first drag gesture:
      seeking to the future point in the first direction and at a first speed corresponding to the first magnitude of the first drag gesture while presenting, in the user interface, a first subset of the plurality of thumbnails concurrently with the video content item played, wherein the first subset includes future thumbnails associated with video content to be played to reach the future point that are displayed based on a predetermined order, and wherein the future thumbnails are presented at a scrolling speed corresponding to the first magnitude of the first drag gesture concurrently with the video content item and comprise a first future thumbnail that is visually indicated as closest in time, as compared to other thumbnails of the future thumbnails, to the future point displayed based on the first drag gesture;

receiving, in the user interface, a second drag gesture to a prior point in the video content item, the prior point corresponding to preceding video content of the video content item, the second drag gesture having a second magnitude and a second direction to rewind playback of the video content item; and responsive to the second drag gesture:
seeking to the prior point in the second direction and at a second speed corresponding to the second magnitude of the second drag gesture while presenting a second subset of the plurality of thumbnails concurrently with the video content item, wherein the second subset includes preceding thumbnails associated with video content to be played to reach the prior point that are displayed based on the predetermined order, and wherein the preceding thumbnails are presented at a scrolling speed corresponding to the second magnitude of the second drag gesture concurrently with the video content item and comprise a second preceding thumbnail that is visually indicated as closest in time, as compared to other thumbnails of the preceding thumbnails, to the prior point displayed based on the second drag gesture.

2. The method of claim 1, further comprising dynamically updating the first subset of thumbnails based on the first magnitude of the first drag gesture.

3. The method of claim 1, further comprising dynamically updating the second subset of thumbnails based on the second magnitude of the second drag gesture.

4. The method of claim 1, wherein the predetermined order is a chronological order.

5. The method of claim 1, wherein the first future thumbnail associated with the future point is displayed differently than the other thumbnails of the future thumbnails, and the second preceding thumbnail associated with the prior point is displayed differently than the other thumbnails of the preceding thumbnails, wherein differences in displaying comprise visual characteristics other than positional closeness of the first future thumbnail and the second preceding thumbnail to the future point and the prior point respectively.

6. The method of claim 1, wherein the user device is a hand-held mobile device.

7. The method of claim 1, further comprising:
causing the video content item to resume playing at a prior speed responsive to no longer detecting the first drag gesture or the second drag gesture.

8. A system comprising:
a memory; and
a processing device, coupled to the memory, to perform operations comprising:
requesting a video content item for viewing, the video content item associated with a plurality of thumbnails, each thumbnail corresponding to a point in the video content item;
playing, in a user interface on a user device, the video content item starting at a current point;
receiving, at a viewing progress bar in the user interface, a first drag gesture to a future point in the video content item, the future point corresponding to subsequent video content of the video content item, the first drag gesture having a first magnitude and a first direction to fast forward playback of the video content item;

responsive to the first drag gesture:
seeking to the future point in the first direction and at a first speed corresponding to the first magnitude of the first drag gesture while presenting, in the user interface, a first subset of the plurality of thumbnails concurrently with the video content item played, wherein the first subset includes future thumbnails associated with video content to be played to reach the future point that are displayed based on a predetermined order, and wherein the future thumbnails are presented at a scrolling speed corresponding to the first magnitude of the first drag gesture concurrently with the video content item and comprise a first future thumbnail that is visually indicated as closest in time, as compared to other thumbnails of the future thumbnails, to the future point displayed based on the first drag gesture;

receiving, in the user interface, a second drag gesture to a prior point in the video content item, the prior point corresponding to preceding video content of the video content item, the second drag gesture having a second magnitude and a second direction to rewind playback of the video content item; and responsive to the second drag gesture:
seeking to the prior point in the second direction and at a second speed corresponding to the second magnitude of the second drag gesture while presenting a second subset of the plurality of thumbnails concurrently with the video content item, wherein the second subset includes preceding thumbnails associated with video content to be played to reach the prior point that are displayed based on the predetermined order, and wherein the preceding thumbnails are presented at a scrolling speed corresponding to the second magnitude of the second drag gesture concurrently with the video content item and comprise a second preceding thumbnail that is visually indicated as closest in time, as compared to other thumbnails of the preceding thumbnails, to the prior point displayed based on the second drag gesture.

9. The system of claim 8, the operations further comprising dynamically updating the first subset of thumbnails based on the first magnitude of the first drag gesture.

10. The system of claim 8, the operations further comprising dynamically updating the second subset of thumbnails based on the second magnitude of the second drag gesture.

11. The system of claim 8, wherein the predetermined order is a chronological order.

12. The system of claim 8, wherein the first future thumbnail associated with the second future point is displayed differently than the other thumbnails of the future thumbnails, and the second preceding thumbnail associated with the prior point is displayed differently than the other thumbnails of the preceding thumbnails, wherein differences in displaying comprise visual characteristics other than positional closeness of the first future thumbnail and the second preceding thumbnail to the future point and the prior point respectively.

13. The system of claim 8, wherein the user device is a hand-held mobile device.

14. The system of claim 8, the operations further comprising:

causing the video content item to resume playing at a prior speed responsive to no longer detecting the first drag gesture or the second drag gesture.

15. A non-transitory computer readable medium including instructions, which when executed by a processor, cause the processor to perform operations comprising:

requesting a video content item for viewing, the video content item associated with a plurality of thumbnails, each thumbnail corresponding to a point in the video content item;

playing, in a user interface on a user device, the video content item starting at a current point;

receiving, at a viewing progress bar in the user interface, a first drag gesture to a future point in the video content item, the future point corresponding to subsequent video content of the video content item, the first drag gesture having a first magnitude and a first direction to fast forward playback of the video content item;

responsive to the first drag gesture:
seeking to the future point in the first direction and at a first speed corresponding to the first magnitude of the first drag gesture while presenting, in the user interface, a first subset of the plurality of thumbnails concurrently with the video content item played, wherein the first subset includes future thumbnails associated with video content to be played to reach the future point that are displayed based on a predetermined order, and wherein the future thumbnails are presented at a scrolling speed corresponding to the first magnitude of the first drag gesture concurrently with the video content item and comprise a first future thumbnail that is visually indicated as closest in time, as compared to other thumbnails of the future thumbnails, to the future point displayed based on the first drag gesture;

receiving, in the user interface, a second drag gesture to a prior point in the video content item, the prior point corresponding to preceding video content of the video content item, the second drag gesture having a second magnitude and a second direction to rewind playback of the video content item; and responsive to the second drag gesture:
seeking to the prior point in the second direction and at a second speed corresponding to the second magnitude of the second drag gesture while presenting a second subset of the plurality of thumbnails concurrently with the video content item, wherein the second subset includes preceding thumbnails associated with video content to be played to reach the prior point that are displayed based on the predetermined order, and wherein the preceding thumbnails are presented at a scrolling speed corresponding to the second magnitude of the second drag gesture concurrently with the video content item and comprise a second preceding thumbnail that is visually indicated as closest in time, as compared to other thumbnails of the preceding thumbnails, to the prior point displayed based on the second drag gesture.

16. The non-transitory computer readable medium of claim 15, the operations further comprising:
dynamically updating the first subset of thumbnails based on the first magnitude of the first drag gesture; and
dynamically updating the second subset of thumbnails based on the second magnitude of the second drag gesture.

17. The non-transitory computer readable medium of claim 15, wherein the predetermined order is a chronological order.

18. The non-transitory computer readable medium of claim 15, wherein the first future thumbnail associated with the future point is displayed differently than the other thumbnails of the future thumbnails, and the second preceding thumbnail associated with the prior point is displayed differently than the other thumbnails of the preceding thumbnails, wherein differences in displaying comprise visual characteristics other than positional closeness of the first future thumbnail and the second preceding thumbnail to the future point and the prior point respectively.

* * * * *